United States Patent
Fontius (10) Patent No.: US 6,925,367 B2
(45) Date of Patent: Aug. 2, 2005

(54) CONTROL METHOD AND SYSTEM FOR AUTOMATIC PRE-PROCESSING OF DEVICE MALFUNCTIONS

(75) Inventor: Joerg Fontius, Neunkirchen (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/442,499

(22) Filed: May 21, 2003

(65) Prior Publication Data

US 2004/0033799 A1 Feb. 19, 2004

(30) Foreign Application Priority Data

May 21, 2002 (DE) .......................................... 102 22 399

(51) Int. Cl.[7] .......................... G06F 7/00; G01M 17/00
(52) U.S. Cl. .......................... 701/33; 701/31; 702/182; 702/188; 700/2; 700/9; 700/19; 700/21; 705/9
(58) Field of Search .................... 705/1, 7–9; 340/3.42, 340/3.9, 500, 517, 523, 3.1–3.3, 3.43–3.44; 370/102.01, 102.02; 700/7, 12, 23, 26, 108–110, 241, 247, 1–2, 9–11, 17–21, 28, 32, 79–83, 159, 168–170, 174, 180–181; 702/184, 56, 33–35, 81–84; 714/1–2, 25, 100, 47–48; 399/8–12, 18, 21; 701/29–35, 1–2

(56) References Cited

U.S. PATENT DOCUMENTS

| | | | | |
|---|---|---|---|---|
| 4,612,620 A | * | 9/1986 | Davis et al. | 702/184 |
| 5,282,127 A | * | 1/1994 | Mii | 700/1 |
| 5,682,421 A | * | 10/1997 | Glovitz et al. | 379/100.05 |
| 5,859,778 A | * | 1/1999 | Kuroda et al. | 700/169 |
| 5,963,886 A | * | 10/1999 | Candy et al. | 702/61 |
| 6,487,375 B2 | * | 11/2002 | Ferrer et al. | 399/8 |
| 2003/0065522 A1 | * | 4/2003 | Wepfer et al. | 705/1 |

* cited by examiner

Primary Examiner—Jacques H. Louis-Jacques
(74) Attorney, Agent, or Firm—Schiff Hardin LLP (57) ABSTRACT

In a control method and a system for the automatic pre-processing of device malfunctions, first data about a device malfunction are sent to a central control device by means of first terminal equipment. On the basis of the first data and on the basis of stored second data, the central control device automatically selects a group of second terminal equipment that are allocated to various service technicians. A malfunction incident signal and at least a part of the data are then sent to the selected terminal equipment and output thereat. The terminal equipment respectively acquires preliminary diagnosis data relating to the malfunction and availability data from the respective service technician. These data are communicated to the central control device, which automatically evaluates the existing data, selects a specific second terminal equipment from the group and communicates an assignment signal to the selected second terminal equipment.

32 Claims, 3 Drawing Sheets

FIG 1

CONTROL METHOD AND SYSTEM FOR AUTOMATIC PRE-PROCESSING OF DEVICE MALFUNCTIONS

BACKGROUND OF THE INVENTION

1. Field of the Invention

The present invention is directed to a control method for the automatic pre-processing of device malfunctions. The invention also is directed to a system for implementation of the method.

2. Description of the Prior Art

A number of works steps usually are required following the report of a malfunction at a device by an operator of the device until the malfunction is eliminated by a service technician. At present, a malfunction registration by a malfunction service usually proceeds by the device operator first reporting the malfunction at the device to a service center of the malfunction service by telephone, for example to a service center of the device manufacturer. It is registered thereat by a service person responsible therefor and may be forwarded to a "pre-troubleshooter". This person initially tries to determine whether a trivial problem exists that can be solved by the device operator with the assistance of telephone support. If such a telephonic solution is not possible, a service technician is ultimately dispatched who handles this malfunction and usually travels to the device operator and eliminates the malfunction on site. This manual registration of the malfunction is decidedly personnel-intensive and thus expensive. Moreover, it is also time-consuming. Especially in the case of expensive large-scale devices that preferably are used around the clock because of their high capital costs, malfunction-induced down times should be reduced as far as possible. In the event of a malfunction, it is therefore necessary that this be eliminated as fast as possible. This means that the times for the pre-processing of the malfunction, with the possible involvement of a service technician on site, also should be reduced to a minimum. This demand for a fast elimination of malfunctions is even more urgent for medical devices, particularly large-scale medical devices such magnetic resonance tomography systems, X-ray tomography systems or the like, for which there is usually no back-up at the place of use and the use of which is often life-sustaining. An outage of such a device therefore can have financial as well as medical significance.

SUMMARY OF THE INVENTION

An object of the present invention is to provide an automatic method for the pre-processing of device malfunctions and a corresponding system for the implementation of such a method that enable a fast and effective pre-processing of reported device malfunctions and thus reduce the overall time for eliminating malfunctions.

This object is achieved in a control method according to the invention wherein first data about a malfunction of a device are communicated to a central, automatic control device by terminal equipment, the first data, for example, are a matter of device data, data about the type of malfunction, the frequency of occurrence, error logs, etc. The first terminal equipment can be, for example, a computer connected to the device to be serviced and having a connection to a public communication network such as a telephone network or the Internet, so that that data are sent from the computer to the central, automatic control device via this communication network. Accordingly, this central control device has a suitable connection to the communication network.

Within the control device, a specific set of second terminal equipment is then selected by means of predefined selection rules on the basis of the received, first data and on the basis of stored, second data. These second terminal equipment are allocated to respectively different service technicians. The second data are, for example, data about the individual service technician such as, for example, responsibility for a specific device or a device operator, degree of training or competency, current availability, etc. The data also can be a matter of additional device data, so that a specific device name, an operator name, an identifier of the operator, etc., can be communicated, and information about the device type, the year built, hardware and software status of the device to be serviced, etc., can then be determined from the stored, second data.

In a third step, a malfunction incident signal and at least a part of the first data and/or a part of the second data and/or third data determined therefrom are then sent to the set of selected second terminal equipment. This data communication preferably ensues via a public communication network such as the Internet or a telephone network. To this end, for example, the central control device can operate a telephone system such that only the second terminal equipment of the selected group are selected and the desired malfunction dependent signal and the data are sent to the respective terminal equipment via the telephone network. The malfunction dependent signal, for example, is a dataset that, when emitted as an output by the second terminal equipment, informs the respective service technician that a malfunction to be attended to exists, and the further data that are transmitted belong to this malfunction of the appertaining device. Additionally, the dataset can contain a unique identification identifier for the malfunction. The third data can be, for example, additional information about the device malfunction such as a machine-generated, preliminary diagnosis that was already automatically communicated from the central control device on the basis of the first data and/or the second data.

In the next step, the output of the communicated malfunction dependent signal and the data ensues by means of the second terminal equipment. To this end, the second terminal equipment includes a display and/or an acoustic output device as well as an input device. Preliminary diagnosis data relating to the malfunction of the device and/or availability data from the service technician are electronically acquired via this user interface. The preliminary diagnosis data can contain, for example, a prioritization and assessment of the malfunction, an error analysis (with an indication of a faulty component), particularly the estimated repair time required, etc., by the service technician. The availability data can contain, for example, the workload level of the service technician, the distance from the device or the estimated travel time or the anticipated arrival time at the device to be serviced, etc.

The electronic acquisition of the data preferably occurs with the assistance of an automatic dialogue system in a dialogue between the respective, second terminal equipment or the automatic dialogue system and the allocated service technician. The type of dialogue or the structure of the automatic dialogue system is dependent on the available user interface of the second terminal equipment. First a dialogue by means of text output or graphic output on a display is possible. A voice dialogue system also can be used. A mixture of the two methods is likewise possible.

Dependent on the complexity of the dialogue system, the interrogation of the service technician can ensue at any level of detail and in a user-friendly manner. When, for example, the service technician answers specific questions of the dialogue system in a specific way, correspondingly more detailed information about this point can be subsequently queried, so that a true, multi-stage dialogue is implemented between the dialogue system and the service technician. Basically, however, a very simple dialogue system is used wherein a type of form that is to be appropriately filled out is generated for the service technician on the user interface. The term "dialogue system" is comprehensively used herein interpreted in this sense.

The dialogue system preferably is constructed such that the system asks the service technician about the critical data in a relatively short time and the data thus can be registered or recorded. The form of a simple query catalogue can be used, including an estimate or prioritization of the malfunction, the arrival time at the malfunctioning device or an estimated time for eliminating the malfunction, for example. It is compulsory for the service technician to provide answers thereto.

In a further step, the preliminary diagnosis data and/or availability data are automatically transmitted back to the central control device. There, the preliminary diagnosis data and/or availability data returned by all second terminal devices are automatically evaluated according to predefined evaluation rules. On the basis of the evaluation results, the central control device selects specific second terminal equipment from the set of second terminal equipment by means of predetermined selection rules.

The central control device then generates an assignment signal and communicates this to the selected second terminal device, the assignment signal being output there by the appertaining second terminal equipment. With this assignment signal, the order for further processing of the malfunction is communicated to the service technician to whom the appertaining second terminal equipment is allocated. For example, the assignment signal can be a dataset that contains the unique identification identifier of the malfunction incident as well as a work order. The pre-processing of the malfunction thus is ended.

In order to enhance the security, the selected second terminal equipment can communicate an acknowledgment signal to the central control device for acknowledging the assignment signal. However, it is also possible for the assignment signal to be considered as accepted after the lapse of a specific waiting time insofar as a corresponding signal with a refusal is not received from the second terminal equipment. After the allocation signal has been directly or indirectly acknowledged, the central control unit automatically schedules the appertaining service technician for the malfunction incident.

If it is not possible or not meaningful to assign a service technician to eliminate the malfunction because, for example, a suitable service technician is not available at the moment, all required data can be handed over to a dispatcher, who manually further-processes the case and attempts to find an individual solution.

An inventive system for the automatic pre-processing of device malfunctions operating according to the above-described method requires at least one first terminal equipment that is allocated to a device to be serviced and that includes a unit for determining of first data about the malfunction of the device and a transmission device for communicating the first data to a central control device.

Such a system usually will be constructed not only for the pre-processing of malfunctions at a single device, but a number of devices usually will be connected in the system. Accordingly, a number of first terminal devices are usually present. This discussion below proceeds on the basis of a specific malfunctioning device only for simplicity.

The inventive system also includes a number of second terminal devices that are respectively allocated to different service technicians and each of which includes:

a reception device for receiving a malfunction incident signal and the various data, i.e. the first data, the second data and, if present, the third data as well as for receiving an assignment signal from the central control device;

a user interface for emitting preliminary diagnosis data and/or availability data from the allocated service technician;

a transmission device for communicating the preliminary diagnosis data and/or the availability data to the central control device.

The second terminal equipment preferably is mobile communication terminal device that the service technicians always carry. A combination of a laptop or PDA (personal digital assistant) and a mobile radiotelephone device can be used for this purpose. Fundamentally, the mobile communication device can be two separate units connected to one another via a corresponding interface—for example, a PDA and a mobile radiotelephone device. In the context of this invention, however, such a device combination is considered as the second terminal equipment. UMTS mobile radiotelephone devices that enable a combination via the Internet or an Intranet and that have an easy-to-use graphic user interface also would be suitable as second terminal devices.

The system always includes an automatic central control device that includes:

a reception device for receiving the first data from the first terminal equipment and for receiving the preliminary diagnosis data and/or the availability data from the second terminal equipment. This can be a common reception device or a number of separate reception devices or reception device components;

a memory with second data stored therein;

a first selection unit for the selection of a group of second terminal equipment by means of predefined selection rules on the basis of the received first data and the stored second data;

a transmission device, which can be an individual transmission device or of a number of transmission devices or transmission device components for the communication with the various equipment;

a unit for the transmission of at least a part of the first data and/or a part of the second data and/or of third data determined therefrom to the group of second terminal equipment via a transmission device;

a second selection device for the evaluation of the first data, the second data, the preliminary diagnosis data and/or the availability data according to predefined evaluation rules and for the selection of a specific second terminal equipment from the group of second terminal equipment on the basis of the evaluation result;

a unit for the generation and communication of an assignment signal to the selected second terminal equipment via a transmission device.

In a preferred exemplary embodiment, the first terminal equipment has a user interface and an automatic dialogue system in order to electronically acquire first data relating to the device to be serviced from an operator of the device to be serviced within a dialogue. This, too, can again be a matter of a complex, multi-stage or a very simple dialogue system wherein only a type of form to be appropriately filled out is generated on the user interface for the operator.

In another preferred exemplary embodiment, the first data encompass operating data and/or error data of the device to be serviced such as, for example, test images or faulty images acquired during the most recent hours of operation, error logs, event logs, etc., that were all registered by a logging device connected to the device to be serviced. This logging device can be situated within the device controller or it can be an external logging device or a logging device integrated in the first terminal equipment.

The malfunction message automatically ensues by means of the device itself or by the connected, first terminal equipment or by means of an external logging device that monitors the appertaining device without requiring any intervention on the part of the answerable operating personnel. All error data and device data are automatically logged, and an error message or malfunction message is automatically sent to the central control device in the event of a malfunction. The operating personnel responsible for the device on site are informed about the malfunction by means of a suitable alarm signal or the like. There is then the possibility for the operating personnel also communicate additional data to the central control device via the first terminal equipment.

The central control device preferably automatically communicates at least a part of the preliminary diagnosis data received by the group of second terminal equipment to the ultimately selected, second terminal equipment together with the assignment signal. Alternatively, this can occur only when a corresponding request signal was received from the appertaining second terminal equipment. The communication of the preliminary diagnosis data received from the remaining second terminal equipment has the advantage that the responsible service technician is automatically informed of the malfunction estimates of his colleagues. These information can be of great assistance to the responsible service technician in the correction of the malfunction.

In another preferred exemplary embodiment, the central control device automatically initiates the establishment of a data connection, for example as a remote service connection, between the device to be serviced and/or the allocated first terminal equipment and the selected second terminal equipment upon or after communication of an assignment signal to a specific second terminal equipment. The central control device has appropriate switching equipment for this purpose. The method can proceed faster by means of the automatic switching by the central control device, so that no time is lost because the service technician must first set up an online connection him/herself.

Moreover, the central control device preferably automatically sends processing signals to the first terminal equipment at specific points in time, this terminal equipment, or the operator of this device thereby being informed that the malfunction is being processed. Such processing signals can be sent after receiving the first data from the first terminal equipment, after receiving preliminary diagnosis data or availability data from the first of the selected second terminal equipment and, for example, after sending an assignment signal to a second terminal equipment or, possibly after receiving an acknowledgment signal from the second terminal equipment. With this third processing signal, further data, for example about the arrival of a technician or whether a malfunction correction is planned first via an online connection with a remote service, etc., then also can be communicated to the first terminal equipment.

Preferably the central control unit includes a fault analysis unit in order to be able to automatically prepare preliminary diagnosis data on the basis of received first data relating to a current malfunction of the device and on the basis of stored device data and/or data about the type of fault. These devices can store fault type data that contains, for example, information about the probability of a particular fault dependent on the device in question and the error combination. Moreover, such fault type data can contain information about the frequency of occurrence of certain faults. Like an expert (trainable neural network) system, such a fault analysis system preferably employs data stored in a memory in an expert data bank.

Preferably, malfunction correction data are electronically acquired and communicated to the central control device with the second terminal equipment during and/or after a correction of the malfunction within a dialogue between the second terminal equipment and the assigned service technician. With such data, the responsible service technician indicates the fault that was actually involved and how the technician corrected this fault. The malfunction correction data then can be employed within the expert system, i.e. new fault type data preferably are determined on the basis of such malfunction correction data and stored in the expert data bank for later malfunction incidents.

The device to be serviced can be any device or a complex system—which is also considered as a device herein. The method has particular utility in the context of large-scale medical devices such magnetic resonance tomography systems or computed tomography systems.

Particularly given a utilization of the method with medical devices, any person-related data (patient data) contained in the first data should be eliminated and/or made anonymous, preferably before a communication from the first terminal equipment to the central control device. Additionally, all access to the person-related data should be logged. Insofar as a public network such as, for example, the Internet is employed for communication of the data, all data preferably are only transmitted in encrypted form. Moreover, it is especially important in this case for the entire system to be protected from outside access with, for example, suitable passwords in order to prevent confidential patient data from being located and to prevent the introduction of viruses, particularly into the medical device itself. For this reason, a point-to-point connection between the appertaining devices of the system via telephone lines or mobile radiotelephone channels is preferred.

In another preferred exemplary embodiment, the central control device sends an additional alarm signal to the appertaining second terminal equipment via a second communication channel if a connection to a specific second terminal equipment is not possible via a first communication channel that is normally employed, for example via a mobile radiotelephone channel, and via which the communication of the malfunction incident signal as well as the appertaining data and/or an assignment signal to the second terminal equipment should ensue. The second communication channel, for example, can be a paging channel. The service technician thus can be alerted if the second terminal equipment cannot be reached, for example because of a non-accessible region in the mobile radiotelephone network or because of a prohibition against mobile radiotelephony in a hospital where the service technician is located at the moment.

To this end, the central control unit must include a unit to generate the additional alarm signal in such a case. Moreover, it must include a transmitter in order to send the alarm signal to the appertaining second terminal equipment. The second terminal equipment must include a second reception device for receiving the alarm signal via the second communication channel and an output for emitting the alarm signal.

In general, it is meaningful for the malfunction to be reported given ongoing device operation—insofar as it is only a minor malfunction that does not cause the device to become unusable. It must be assured, that the safety features of the device, for example the dose monitoring or SAR monitoring given medical devices, function faultlessly for a transmission of logged datafiles in interactions with the central control device and with the second terminal equipment of the respective service technician during a remote service. Moreover, the functionability or performance of the device—for example in the case of nuclear magnetic resonance tomography systems and X-ray tomography systems—, the possibility of performing diagnoses, as well as the image quality, the patient data, the consistency, etc., are preserved insofar as possible.

In a preferred exemplary embodiment, the operator of the serviced device has the capability to track the service process by means of an event log and to monitor the access to the appertaining device by the central control device or by a terminal equipment of a service technician. The on-site operating personnel thus can decide whether, for example, a service call by means of a remote service is feasible. In another exemplary embodiment, the access mode to the device can be controlled. A selection can be made whether to allow limited access, wherein operation of a patient treatment or patient examination mode is still possible, or whether to allow full access, wherein the device is no longer used and is completely available to a remote service. Insofar as remote service occurs during ongoing operation of the device, the performance of the device must not be significantly reduced due to the remote service. Moreover, the operating personnel preferably can abort the service activities at any time, the device being configured to automatically return to the original status insofar as this is not precluded the malfunction.

The inventive method and the inventive system allow a decidedly fast and effective pre-processing of the information relating to a malfunction and thus helps to reduce the pre-processing time to a minimum. By means of a suitable, fully automatic operation of a telephone system in the central control device, for example, all data or telephone connections can be set up in order to fully automatically inform all appropriate service technicians nearly simultaneously about the malfunction. Service technicians who would not be appropriate for servicing the particular malfunction, in contrast, are not unnecessarily bothered. In the shortest possible time, estimates of the malfunction in question are collected from all notified malfunction technicians, and this information is used to assign the optimum service technician for the particular malfunction, with competency, training and fastest availability being taken into consideration in the selection.

DESCRIPTION OF THE PREFERRED EMBODIMENTS

Figure 1:
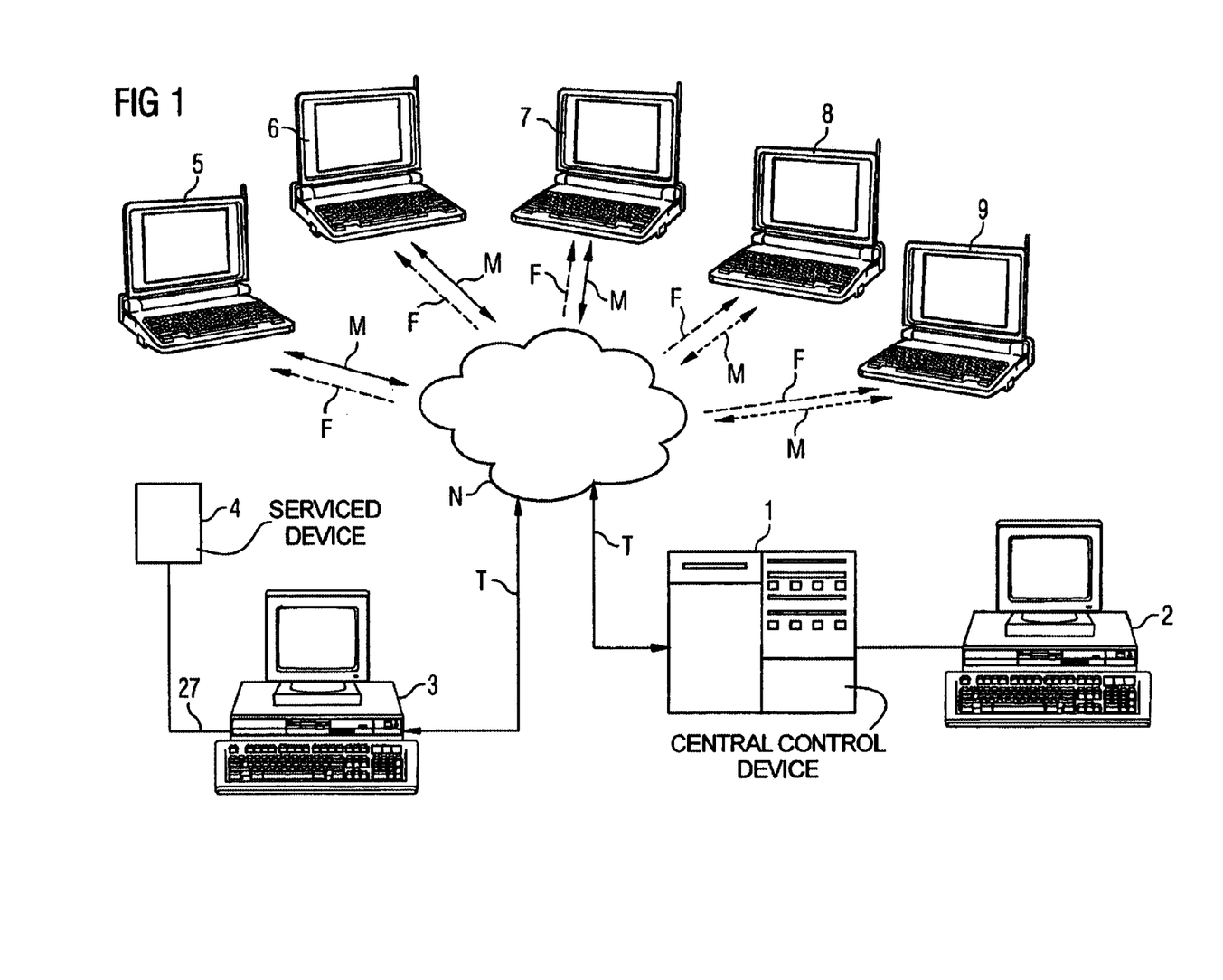
FIG. 1 is a schematic illustration of an inventive system.

As basic components, the exemplary embodiment of an inventive system shown in FIG. 1 includes a central control device 1, first terminal equipment connected to a device 4 which may at some point require servicing, as well as a number of second, mobile terminal equipment 5, 6, 7, 8, 9. The mobile second terminal equipment 5 through 9 can be a PDA/mobile radiotelephone combination in which a paging receiver (also called "beeper" or "pager") is integrated.

The central control device 1 and the first terminal equipment 3 are each connected to a fixed (line-based) telephone network via fixed network terminals T. The individual mobile communication termination equipment 5 through 9 are connected to a mobile radiotelephone network via corresponding mobile radiotelephone interfaces M and to a paging service via paging interfaces F. Both networks or services are in turn connected to the fixed network. Since it is possible at any time to dial into the mobile radiotelephone network from a fixed network terminal and vice versa or, respectively, to dial a pager receiver, all of the networks are shown here as a common public communication network N via which all device 1, 3, 5, 6, 7, 8, 9 can enter into communication with one another.

In the following exemplary embodiment, point-to-point telephone connections are employed for the communication of the mobile communication terminal equipment 5, 6, 7, 8, 9 with the central control device 1 and/or with the first terminal equipment 3. A point-to-point connection is likewise utilized for the communication between the first terminal equipment 3 and the central control device 1. Other public communication networks, of course, can be employed instead of this point-to-point connection, for example the Internet or an Intranet of the service provider. A direct radio connection between the respective devices that does not proceed via a public network is also possible. Further, a combination of the various communication links can be utilized. The use of individual point-to-point telephone connections between the devices 1, 3, 5 though 9, however, has the advantage that networks that already exist can be used as well as establishing a relatively high security against tapping or eavesdropping, so that an encryption of the data on the transmission link is not necessarily required.

For clarity, only one device 4 to be serviced that has first terminal equipment 3 is shown in the example according to FIG. 1. As a rule, however, it is to be assumed that a number of devices 4 having first terminal equipment 3 communicate with the central control device 1. The central control device 1 is constructed such that it is able to handle multiple malfunction incidents in parallel.

Figure 2:
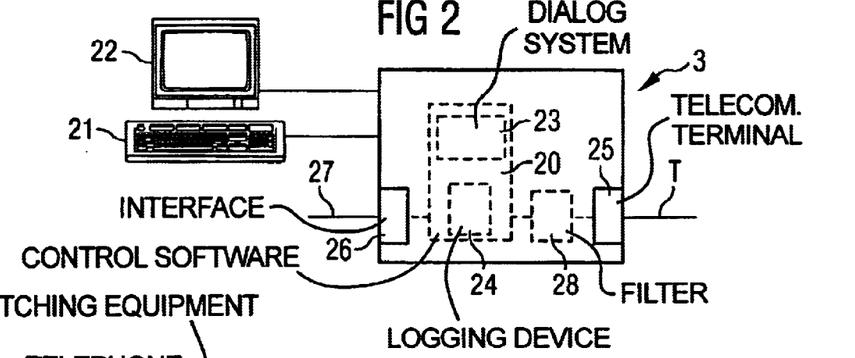
FIG. 2 is a more detailed schematic illustration of a first terminal equipment allocated to the device to be serviced in the inventive system.

The first terminal device 3 employed according to FIG. 1 is schematically shown again in greater detail in FIG. 2. This is a standard PC that is equipped with the appropriate hardware and software components for employment in the inventive method. For clarity, only the specific hardware and software components important for the invention are shown in FIG. 2. It is clear that the terminal equipment 3 also includes all other hardware and software components of a commercially available PC such as operating system, various drivers, interfaces, memories, etc.

The first terminal equipment has a user interface with a keyboard 21 and a picture screen 22. It is also assumed in the present exemplary embodiment that the terminal equipment 3 simultaneously serves for the control of the device 4 to be serviced, i.e. that it serves as the control device for the ongoing operation of the device 4. Accordingly, the device 4 is connected to an interface 26 of the first terminal equipment 3 via a line 27. Moreover, suitable control software 20 with which the device 4 can be controlled with the assistance of the user interface 21, 22 is installed in the first terminal equipment 3.

An automatic dialogue system 23 that, for example, can be implemented as module within the control software 20 is also a component of the device control software 20. In the event of a malfunction, the operator of the device 4 can call a service menu within the user interface employed for the device control by means of this dialogue system 23. Within the dialogue between the system and the operator, the operator is prompted to enter a brief description of the error and to prioritize the malfunction on the basis of given categories. For example, the dialog system could present a pop-up menu with a "form" of a malfunction report on the user interface for this purpose, this "form" containing check boxes for a total outage, for a sporadic outage, for the type of problem or whether it is a matter of an application problem, an image quality problem, a technical question, etc., and including a selection field for the number of outages. Additionally, there is a text field in which the user can describe the malfunction or formulate a technical question. This malfunction report form is then filled out by the user in the dialogue.

The terminal equipment 3 also has a logging device 24. This is a software module 24 and a memory area of the terminal equipment 3 reserved for the logging function. Important operating data, for example images generated with the device 4 during operation, are obtained and stored by the logging device 24. Additionally, operating data and error data of the device 4 such as user interactions, error logs, event logs, etc., are logged.

The information about the malfunction determined with the dialogue as well as the logged operating data and error data are then communicated to the central control device 1 via a telecommunication terminal 25, for example a modem card or an ISDN card that usually serves as a transmission device and as reception device, as well as via the telephone line T. Previously, however, all patient-related data are eliminated or rendered anonymous insofar as possible in a filter device 28. The filter device 28 likewise preferably is a software module.

Figure 3:
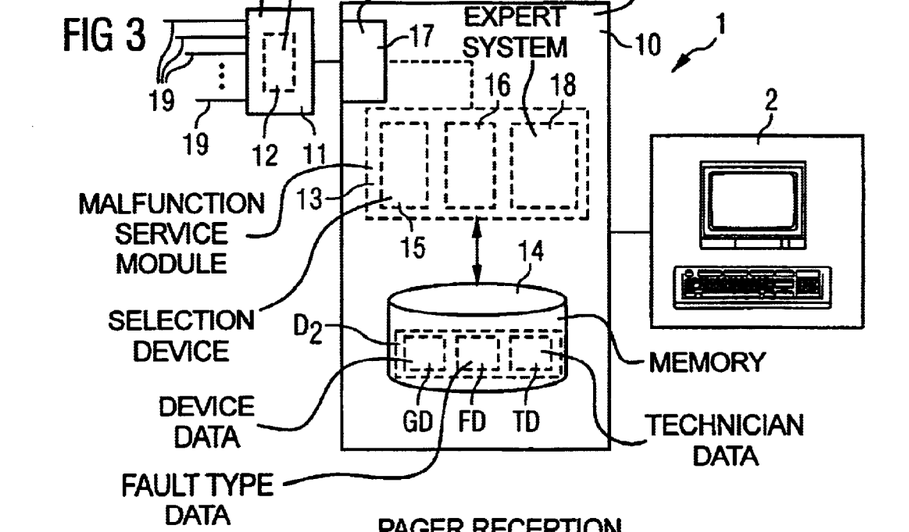
FIG. 3 is a more detailed schematic illustration of the central control device in the inventive system.

FIG. 3 shows the central control device 1 of FIG. 1 is greater detail. This a server 10 with a telephone system 11 having a number of terminals via which the central control device 1 can communicate via a telephone network N with the first terminal equipment 3 that are allocated to the various devices 4 to be serviced as well as with second, mobile terminal equipment 5 through 9 belonging to the service provider.

The telephone system 11 can be a system integrated into the server 10 or—as shown in FIG. 3—an external system that, for example, is connected to the server 10 via a corresponding interface 17. Only the components of the central control device 1 that are important for the illustrated exemplary embodiment of the invention are shown in FIG. 3. The server 10 of course also has all other standard components of a server, for example an operating system, etc.

A terminal 2 having a keyboard and a picture screen as user interface is also connected to the central control device 1.

The central control device 1 has a specific malfunction service module 13 that includes a first selection device 15 and a second selection device 16. The malfunction service module 13 can be implemented in the server 10 in the form of suitable software. The first selection device 15 and the second selection device 16 also can be implemented in the form of software modules within the malfunction service module 13 in the server.

The first selection device 15 is required in order to automatically select a group of second terminal equipment 5, 6, 7 that are respectively allocated to the various service technicians on the basis of the first data $D_1$ received from a first terminal equipment 3 in case of malfunction in common with second data $D_2$ stored in a memory 14. This ensues via a corresponding drive of the telephone system 11 by the malfunction service module 13 via the interface 17.

In the illustrated exemplary embodiment, the second data $D_2$ stored in the memory 14 include a data bank with device data GD, a data bank with fault type data FD and a data bank with technician data TD. The technician data TD represent information about the individual technicians with respect to the level of their training, their responsibility for specific devices at specific device operators, their current location known within the central control device, vacation times, telephone numbers, etc. The device data GD can be, for example, information about the individual devices or device types, versions, options, specific characteristics of the respective device 4 to be serviced, etc. In particular, the device data GD contain all hardware and software components of the devices of all device operators. The fault type data FD can represent information about specific faults that, for example, are attributable to specific causes either alone or in specific combinations of faults, as well as their probabilities of occurring, etc.

Figure 5:
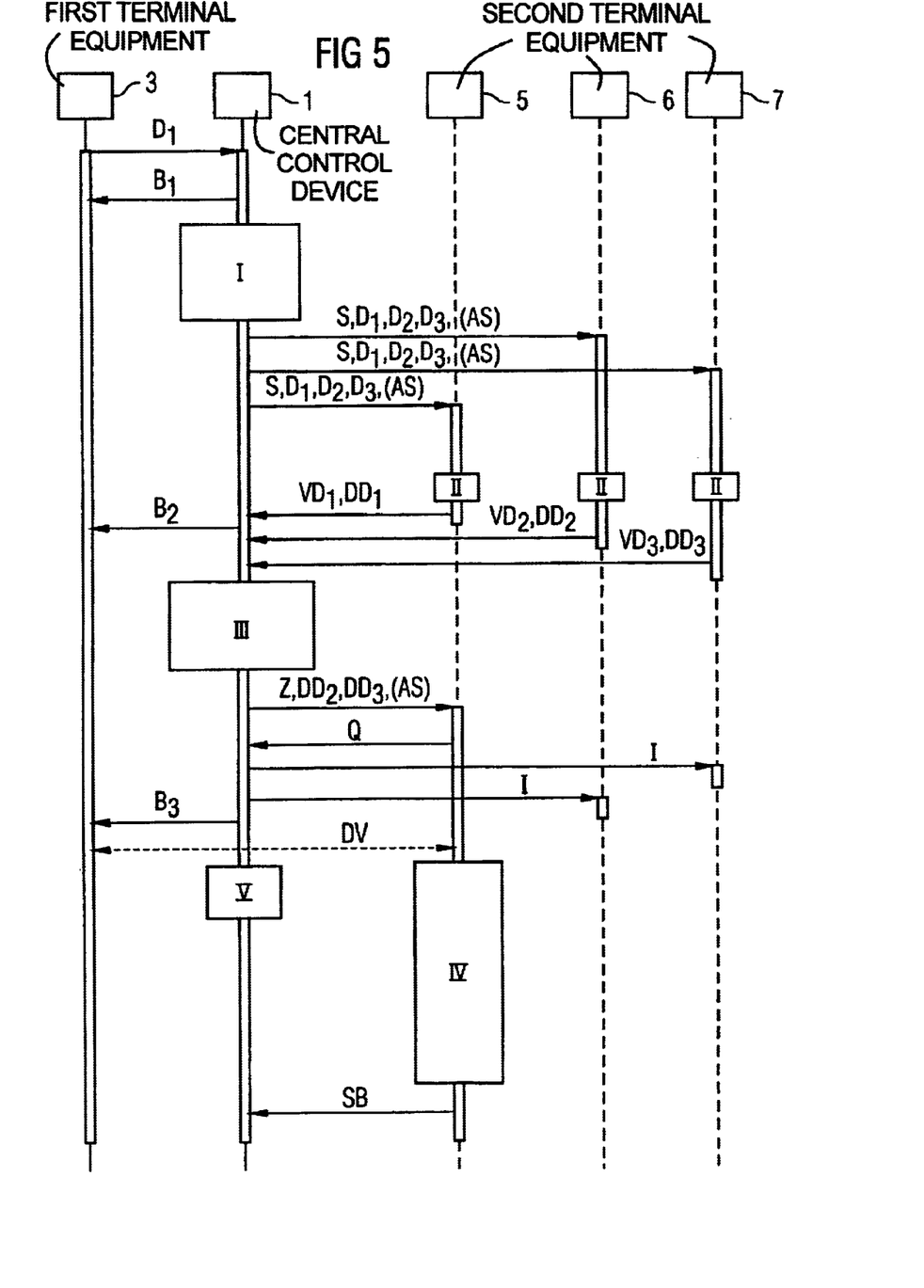
FIG. 5 is a schematic illustration of a possible execution of the inventive method from the report until the elimination of a device malfunction.

FIG. 5 also illustrates the functions of the individual devices of the central control device 1. FIG. 5 shows the method execution in the form of time lines as well as the individual data transmissions between the various devices. The executive sequence begins here with the transmission of the first data $D_1$ electronically compiled at the first terminal equipment 3 by the device operator. After receipt of the first data $D_1$, the malfunction service module 13 in the central control device 1 generates a first acknowledge signal $B_1$ as an acknowledgment for the device operator and returns this to the first terminal equipment 3, so the operator of the device 4 is informed that the malfunction report has arrived in the central control device 1.

In a method step I (FIG. 5), a group of the mobile terminal equipment 5 through 7 is subsequently selected with the selection device 15 on the basis of the first data $D_1$ and of the second data $D_2$. This selection ensues according to specific selection rules, for example according to search criteria such as availability of a technician, distance from the malfunction, training and experience profile, responsibility for the specific device to be serviced, etc. To this end, the first data $D_1$ are linked with the second data $D_2$, particularly the device data GD and the technician data TD stored there. For example, the second terminal equipment of all service technicians can be selected who are classified on the basis of the technician data as having competency for the respective device 4 and who are situated within a specific geographical area around the location of the device 4 and could be available.

A machine-generated preliminary diagnosis also already be produced on the basis of the communicated first data $D_1$, the device data GD and the fault type data FD. The machine determination of the preliminary diagnosis data on the basis of the fault type data FD and the device data GD as well as the first data $D_1$ can ensue within an expert system 18 that is implemented on the server 10 as a software module.

Via the interface 17, the malfunction service module 13 then operates the telephone system 11 such that all communication terminal equipment 5, 6, 7 of the selected group are automatically dialed, and the first data $D_1$ obtained from the first terminal equipment 3 as well as—possibly—a part of the second data $D_2$ and/or the third data $D_3$ are communicated to the respective terminal equipment 5, 6, 7. This is also schematically shown in FIG. 1. Here, only the terminal equipment 5, 6, 7 are contacted by the central control device 1 (illustrated with solid arrows between the respective communication terminal equipment 5, 6, 7 and the network N), in contrast to which the two other communication terminal equipment 8, 9 are not contacted (shown with dashed-line arrows).

First, the malfunction service module 13 generates a malfunction incident signal S that is sent to the appertaining second terminal equipment 5, 6, 7. This signal contains the data D1, D2, D3 to be transmitted or is linked to these and is emitted to the respective terminal equipment 5, 6, 7 as an alarm in order to signal the malfunction incident to the appertaining service technician.

FIG. 5 shows the executive sequence again in terms of time. The individual second communication terminal equipment 6, 7 and 5 are successively contacted, and the malfunction incident signal with the data $D_1$, $D_2$, $D_3$ is communicated to the respective terminal equipment 6, 7, 5. The sequence is arbitrarily selected here. In reality, the transmission is dependent on whether the respective second terminal equipment 5, 6, 7 can be reached at this point in time, i.e. that the respective terminal equipment is not, for example, situated in a radio inaccessible area and is not switched off and that communication is not already being carried with this device 5, 6, 7. Fundamentally, a parallel transmission via multiple lines is also possible.

If no communication with the terminal equipment of a service technician arises via the mobile radiotelephone network (standard communication route), for example because of a radio inaccessible area or a prohibition against mobile radiotelephony, for example in hospitals, the malfunction module 13 initiates the telephone system 11 to dial the unreachable terminal equipment via the paging service (backup communication route) and transmits an alarm signal (AS), for example an acoustic alarm. In response thereto, the service technician can set up a connection between his/her terminal equipment and the mobile radiotelephone network, so that communication is possible via the standard route. The unreachable terminal equipment is then automatically redialed by the central control device 1 at a later point in time.

Alternatively, the device 5, 6, 7 can be automatically redialed again by the central control device 1 at a later time even without the additional alarm signal when an attempted contact is unsuccessful.

A second basic method step 11 then occurs at the individual mobile terminal equipment 5, 6, 7. The malfunction incident signal S is transmitted to the notified service technician in common with the data $D_1$, $D_2$, $D_3$. This service technician thus is informed quickly about the malfunction in detail.

Using an automatic dialogue system, preliminary diagnosis data $DD_1$, $DD_2$, $DD_3$ relating to the malfunction of the device 4 and/or availability data $VD_1$, $VD_2$, $VD_3$ are then generated within a dialogue between the respective terminal equipment 5, 6, 7 and the allocated service technician. The preliminary diagnosis data $DD_1$, $DD_2$, $DD_3$ represent an estimate or prioritization of the malfunction by the selected technician as well as—optionally—a fault correction proposal. Categories also can be given for indicating the preliminary diagnosis data $DD_1$, $DD_2$, $DD_3$, so that the technician can process the matter relatively fast. The estimated time for correcting the malfunction should likewise be indicated here. The availability data $VD_1$, $VD_2$, $VD_3$ can represent the current workload of the respective service technician, the distance from the device to be serviced or the estimated travel time or the time for the anticipated arrival at the device. The notified technician also can indicate within the preliminary diagnosis data $DD_1$, $DD_2$, $DD_3$ whether the technician—insofar as he/she is handling the malfunction—would like to have an online connection to the malfunctioning device 4 in order to run various tests via a remote service or to potentially attempt to directly correct the malfunction.

Figure 4:
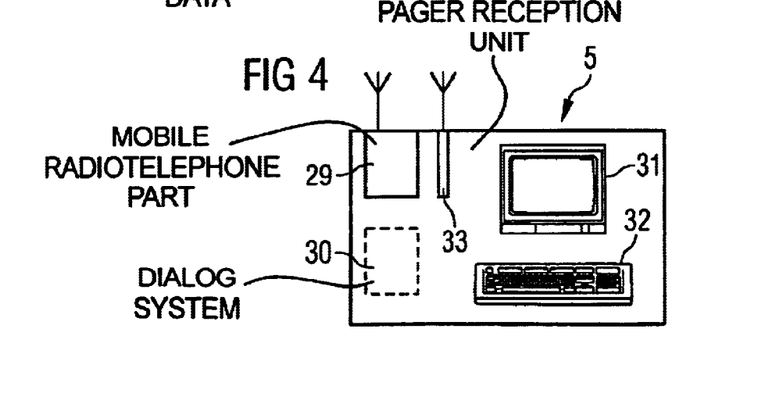
FIG. 4 is a more detailed schematic illustration of a second terminal equipment allocated to a service technician in the inventive system.

FIG. 4 presents a rough outline of the structure of such a mobile terminal equipment 6, 7, 8, 9. The equipment includes a mobile radiotelephone part 29 component a transmission stage and a reception stage as well as a pager reception unit 33. The equipment 6–9 usually have a user interface composed of a display 31 and a keyboard 32. Of course, a user interface with touch screen or the like can be used instead of such a user interface with a keyboard. A microphone and an acoustic output device can also serve as the user interface. For managing the dialogue, the device also has a suitable dialogue system 30, in the form of a software module 30 here. Of course, the device also has all other standard components of a personal digital assistant or a laptop, a mobile radiotelephone device as well as of a pager receiver (for example, a "Euro-beeper"). These components such as an operating system, a memory, various interfaces, etc., are not shown for clarity.

As can be seen from FIG. 5, the respective terminal equipment 5, 6, 7 return the preliminary diagnosis data $DD_1$, $DD_2$, $DD_3$ and the availability data VD1, VD2, VD3 to the central control device 1 at various points in time, dependent on when the appertaining service technician reacted to the query and the dialogue was ended. After receipt of the first dataset $VD_1$, $DD_1$, the central control device 1 automatically sends a further acknowledgment signal $B_2$ to the first terminal equipment 3 of the device operator, so that the latter is informed that the reported malfunction is being properly processed.

The answerbacks, i.e. all data VD1, VD2, VD3, DD1, DD2, DD3 received from the second terminal equipment, are logged on the central control device 1 and stored in a memory area that is allocated to the device to be serviced or to the device operator and/or to the respective malfunction incident. In method step III, the answerbacks are automatically evaluated, and the second terminal equipment 5 that is allocated to the most suitable service technician is thus selected. The selection can ensue in such a way that a priority value for the individual service technician is first defined on the basis of the fault data as well as the experience of the individual service technician with the corresponding device type. Moreover, a further priority value can be defined regarding which service technician would be the first to have time to correct the malfunction or could arrive at the device to be serviced fastest. A suitable selection is then made, with a different weighting being assigned to the various priority values dependent on the seriousness of the incident and the need for rapid response. This selection of the suitable terminal equipment or of the appertaining service technician occurs in a second selection device 16.

If no suitable service technician is available because, for example, all service technicians are totally busy and could not arrive at the apparatus in time, then the case is handed over to the connected terminal 2 for further manual processing. A dispatcher working at this terminal 2 then attempts to find a case-by-case solution for the specific problem.

As soon as a second terminal equipment or a corresponding service technician has been selected, the malfunction service module 13 automatically operates the telephone system 11 such that the appertaining equipment 5 is selected and an assignment signal Z generated by the malfunction service module 13 is transmitted to the terminal equipment 5. If no communication is possible via the mobile radiotelephone network, the service technician is alerted via the paging channel in this case, as well, and is thus requested to set up a mobile radiotelephone connection. As a result of the output of this assignment signal Z, the selected service technician is informed that he/she is responsible for the current malfunction incident. The unique identifier of the malfunction incident also can be transmitted again. Additionally, the preliminary diagnosis data DD2, DD3 that the central control device 1 received from the other terminal equipment 6, 7 can be optionally transmitted to the second terminal equipment 5 of the selected service technician together with the assignment signal Z in order to inform the appertaining service technician about the estimate of the malfunction made by his/her colleagues.

In a time lapse, FIG. 5 additionally shows that the appertaining second terminal equipment 5 sends and acknowledge signal Q to the central control device 1, so that the central control device 1 is informed that the assignment signal Z has arrived at the appertaining second terminal equipment 5 and the case has been taken over by the appertaining service technician.

After receiving this acknowledge signal Q, the central control device 1 then informs the other two terminal equipment 6, 7 of the selected group with automatic information signals I that the malfunction incident was assigned to a different service technician. Moreover, a third acknowledge signal $B_3$ is sent to the first terminal equipment 3 in order to inform the responsible device operator thereat that a specific service technician was assigned to the case. If requested by the selected service technician and if a corresponding request was communicated within the preliminary diagnosis data $DD_1$ an online connection DV is set up between the second terminal equipment 5 of the selected service technician and the first terminal equipment 3 to which the device 4 to be serviced is connected. This ensues via switching equipment 12 in the telephone system 11 that emits corresponding signals to the telephone network. The control of the switching equipment 12 in the telephone system 11 likewise ensues via the malfunction service module 13.

In method step IV the service technician attends to the malfunction. In method step V, the appertaining service technician is scheduled for the malfunction incident by the central control device 1, i.e. the fact that the service technician is handling this malfunction is documented.

When the service technician has corrected the malfunction, the appertaining mobile terminal equipment 5 transmits malfunction correction data SB to the central control device 1. As a result, the malfunction incident is logged off at the central control device 1. The renewed availability of the service technician is automatically documents in the central control device 1 and the malfunction case is closed.

The entire malfunction history can be stored and logged in the central control device 1 and the second terminal equipment 5. The malfunction correction data SB thus can also include a log about the malfunction correction SB. For example, the expert system 18 can produce new fault type data on the basis of the malfunction correction data SB. The expert system is trainable as a result thereof and can make use of the experience gained in the previous malfunction incidents for further malfunction incidents.

An additional possibility is to store this malfunction correction log on the server 10 of the central control device 1 in the fashion of a discussion forum that all other service technicians can access with their mobile terminal equipment 6, 7, 8, 9 in order to exchange experiences. After filtering and editing the experience reports, the essential data can then be stored in the fault type data bank. This filtering and editing alternatively can ensue with the automatic expert system 18.

The malfunction correction data also can contain billing information, so that data about the work time and the required replacement parts are immediately transmitted to the central control device 1 and an invoice can be prepared. It is likewise possible to also simultaneously communicate a customer confirmation, for example by means of a scanned-in signature at the second terminal device 5, with the second terminal device 5 in order to thus fully automatically close the malfunction case.

As the exemplary embodiment shows, the invention offers an extraordinarily fast and economical resolution of a malfunction, wherein, in particular, the preprocessing time until the arrival of a technician can be considerably shortened. Since all information are automatically forwarded from the malfunctioning device to the attending service technician, transmission errors are nearly impossible.

Although modifications and changes may be suggested by those skilled in the art, it is the intention of the inventors to embody within the patent warranted hereon all changes and modifications as reasonably and properly come within the scope of their contribution to the art.

I claim as my invention:

1. A control method for automatically preprocessing a malfunction of a device, comprising the steps of:

allocating first terminal equipment to a device susceptible to malfunctions and, upon an occurrence of a malfunction in said device, communicating first data about said malfunction from said first terminal equipment to an automatic central control device located remote from said device;

providing access from said central control device to stored second data and at said control device, dependent on said first data and said second data, automatically selecting a group of second terminal equipment using predefined selection rules, said second terminal equipment being respectively allocated to a plurality of service technicians;

communicating data, as communicated data, selected from the group consisting of at least a portion of said first data and at least a portion of said second data, together with a malfunction incident signal from said central control device to said group of second terminal equipment;

at each second terminal equipment in said group, emitting said malfunction incident signal and said communicated data and electronically acquiring data, as acquired data, selected from the group consisting of preliminary diagnosis data relating to said malfunction and availability data for the service technician allocated to the second terminal equipment;

communicating the acquired data from each second terminal equipment to said central control device;

at said central control device, evaluating said communicated data and said acquired data according to predefined evaluation rules, thereby obtaining an evaluation result;

selecting one of said second terminal equipment, as selected equipment, in said group dependent on said evaluation result; and in said central control device, generating an assignment signal, and communicating said assignment signal from said central control device to said selected equipment, and emitting said assignment signal at said selected equipment.

2. A control method as claimed in claim 1 comprising the additional step of formulating third data from said second data, and wherein the step of communicating said communicated data comprises selecting said communicated data from the group consisting of at least a part of said first data, at least a part of said second data, and at least a part of said third data.

3. A control method as claimed in claim 2 wherein said second data comprise data selected from the group consisting of device data relating to said device and fault type data representing characteristics of different ones of said malfunctions, and comprising automatically generating preliminary diagnosis data, as said third data, at said central control device dependent on said second data.

4. A control method as claimed in claim 1 comprising obtaining said first data in an automatic dialog between an operator of said device and said first terminal equipment.

5. A control method as claimed in claim 1 comprising obtaining said first data with a logging device connected to said device susceptible to malfunctions, and selecting said first data from the group consisting of operating data and fault data.

6. A control method as claimed in claim 1 comprising, at said second terminal equipment, obtaining said acquired data in an automatic dialog between the second terminal equipment and the service technician allocated thereto.

7. A control method as claimed in claim 1 wherein said acquired data comprise said preliminary diagnosis data, and automatically communicating said preliminary diagnosis data, from each of said second terminal equipment received at said central control device, from said central control device to said selected equipment together with said assignment signal.

8. A control method as claimed in claim 1 wherein said acquired data comprise said preliminary diagnosis data, and communicating said preliminary diagnosis data, received from each of said second terminal equipment at said central control device, from said central control device to said selected equipment upon receipt of a request signal from said selected equipment at said central control device.

9. A control method as claimed in claim 1 comprising employing a first communication channel between said central control device and said second terminal equipment in said group for communicating said malfunction incident signal, said communicated data and said assignment signal, determining at said central control device whether a connection to any of said second terminal equipment via said first communication channel does not exist and, if so, communicating an alarm signal via a second communication channel from said central control device to the second terminal equipment for which no connection exists via said first communication channel.

10. A control method as claimed in claim 1 comprising after transmission of said assignment signal to the selected equipment, said central control device automatically initiating a set-up of a data connection between the selected equipment and at least one of said device and said first terminal equipment.

11. A control method as claimed in claim 1 comprising automatically communicating a processing signal from said central control device to said first terminal equipment informing said first terminal equipment that a service technician has been selected for said malfunction.

12. A control method as claimed in claim 11 comprising generating malfunction correction data contemporaneously with correction of said malfunction of said device, and communicating said malfunction correction data from said selected equipment to said central control device.

13. A control method as claimed in claim 12 comprising formulating new fault type data at said central control device dependent on said malfunction correction data, and storing said new fault type data at said central control device for use in servicing future malfunctions.

14. A control method as claimed in claim 1 comprising employing a medical device as said device susceptible to malfunctions.

15. A control method as claimed in claim 1 wherein said first data include person-related data, and comprising the step of eliminating said person-related data from said first data at said first terminal equipment before communicating said first data from said first terminal equipment to said central control device.

16. A control method as claimed in claim 1 wherein said first data include person-related data, and rendering said person-related data anonymous at said first terminal equipment before communicating said first data from said first terminal equipment to said central control device.

17. A system for automatically preprocessing a malfunction of a device, comprising:

a device susceptible to malfunctions, an automatic central control device located remote from said device susceptible to malfunctions;

first terminal equipment allocated to said device susceptible to malfunctions which, upon an occurrence of a malfunction in said device, communicates first data about said malfunction from said first terminal equipment to said central control device;

second terminal equipment respectively allocated to a plurality of service technicians;

a memory containing second data accessible by from said central control device, said control device, dependent on said first data and said second data, automatically selecting a group of said second terminal equipment using predefined selection rules;

said central control device communicating data, as communicated data, selected from the group consisting of at least a portion of said first data and at least a portion of said second data, together with a malfunction incident signal from said central control device to said group of said second terminal equipment;

each second terminal equipment in said group emitting said malfunction incident signal and said communicated data and electronically acquiring data, as acquired data, selected from the group consisting of preliminary diagnosis data relating to said malfunction and availability data for the service technician allocated to the second terminal equipment;

each second terminal equipment communicating the acquired data therefrom to said central control device;

said central control device evaluating said communicated data and said acquired data according to predefined evaluation rules, thereby obtaining an evaluation result; and selecting one of said second terminal equipment, as selected equipment, in said group dependent on said evaluation result; and said central control device generating an assignment signal and communicating said assignment signal from said central control device to said selected equipment, and said selected equipment emitting said assignment signal.

18. A system as claimed in claim 17 wherein said control device formulates third data from said second data, and communicates said communicated data selected from the group consisting of at least a part of said first data, at least a part of said second data, and at least a part of said third data.

19. A system as claimed in claim 18 wherein said second data comprise data selected from the group consisting of device data relating to said device and fault type data representing characteristics of different ones of said malfunctions, and wherein said central control device automatically generates preliminary diagnosis data, as said third data, dependent on said second data.

20. A system as claimed in claim 17 comprising an automatic dialog system at said first terminal equipment for obtaining said first data in an automatic dialog between an operator of said device and said first terminal equipment.

21. A system as claimed in claim 17 comprising a logging device connected to said device susceptible to malfunctions for logging said first data as data selected from the group consisting of operating data and fault data.

22. A system as claimed in claim 17 comprising, at least second terminal equipment, obtaining said acquired data in an automatic dialog between the second terminal equipment and the service technician allocated thereto.

23. A system as claimed in claim 17 wherein said acquired data comprise said preliminary diagnosis data, and automatically communicating said preliminary diagnosis data therefrom to said central control device, and wherein said central control device communicates all of said preliminary diagnosis data to said selected equipment together with said assignment signal.

24. A system as claimed in claim 17 wherein said acquired data comprise said preliminary diagnosis data, and wherein each second terminal equipment communicates said preliminary diagnosis data therefrom to said central control device, and wherein said central control device communicates all of said preliminary diagnosis data to said selected equipment upon receipt of a request signal from said selected equipment at said central control device.

25. A system as claimed in claim 17 comprising a first communication channel between said central control device and said second terminal equipment in said group for communicating said malfunction incident signal, said communicated data and said assignment signal, and wherein said central control device determines whether a connection to any of said second terminal equipment via said first communication channel does not exist and, if so, communicates an alarm signal via a second communication channel from said central control device to the second terminal equipment for which no connection exists via said first communication channel.

26. A system as claimed in claim 17 wherein said control device, after transmission of said assignment signal to the selected equipment, automatically initiates a set-up of a data connection between the selected equipment and at least one of said device and said first terminal equipment.

27. A system as claimed in claim 17 wherein said central control device automatically communicates a processing signal therefrom to said first terminal equipment informing said first terminal equipment that a service technician has been selected for said malfunction.

28. A system as claimed in claim 27 comprising entering malfunction correction data into said selected equipment contemporaneously with correction of said malfunction of said device, and wherein said selected equipment communicates said malfunction correction data therefrom to said central control device.

29. A system as claimed in claim 28 wherein said central control device formulates new fault type data dependent on said malfunction correction data, and stores said new fault type data at said central control device for use in servicing future malfunctions.

30. A system as claimed in claim 17 wherein said device susceptible to malfunctions is a medical device.

31. A system as claimed in claim 17 wherein said first data include person-related data, and wherein said first terminal equipment comprises a filter for eliminating said person-related data from said first data before communicating said first data from said first terminal equipment to said central control device.

32. A system as claimed in claim 17 wherein said first data include person-related data, and wherein said first terminal equipment comprises a filter for rendering said person-related data anonymous before communicating said first data from said first terminal equipment to said central control device.

* * * * *